Dec. 13, 1938.　　　　I. C. JENNINGS　　　　2,140,079

CONTROL MECHANISM FOR STEAM HEATING SYSTEMS

Filed Jan. 17, 1935　　　　7 Sheets-Sheet 1

Inventor

Irving C. Jennings,

By　Southgate Fay & Hawley

Attorney

Dec. 13, 1938.    I. C. JENNINGS    2,140,079
CONTROL MECHANISM FOR STEAM HEATING SYSTEMS
Filed Jan. 17, 1935    7 Sheets-Sheet 2
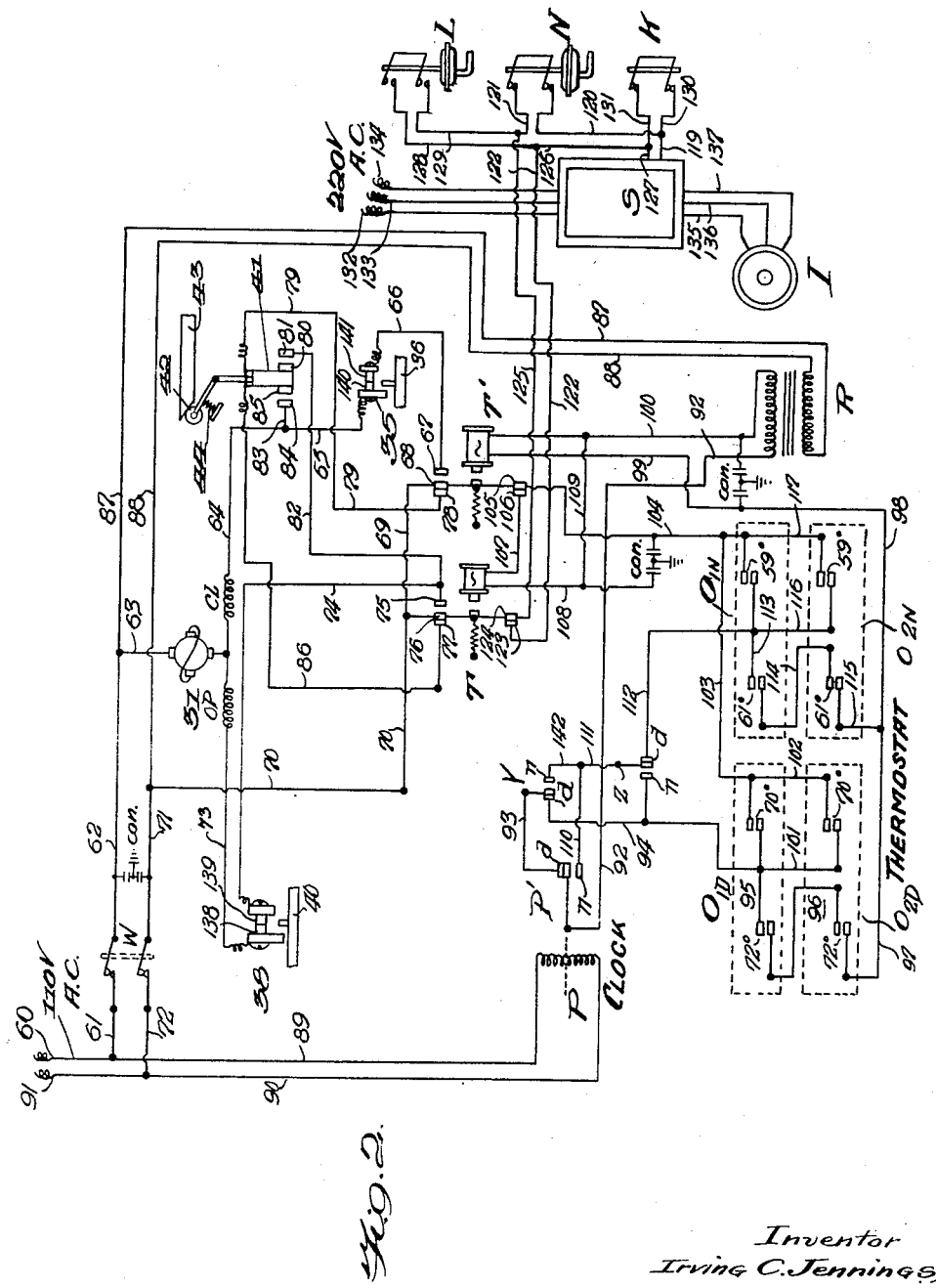
Inventor
Irving C. Jennings,
By [signature]
Attorneys

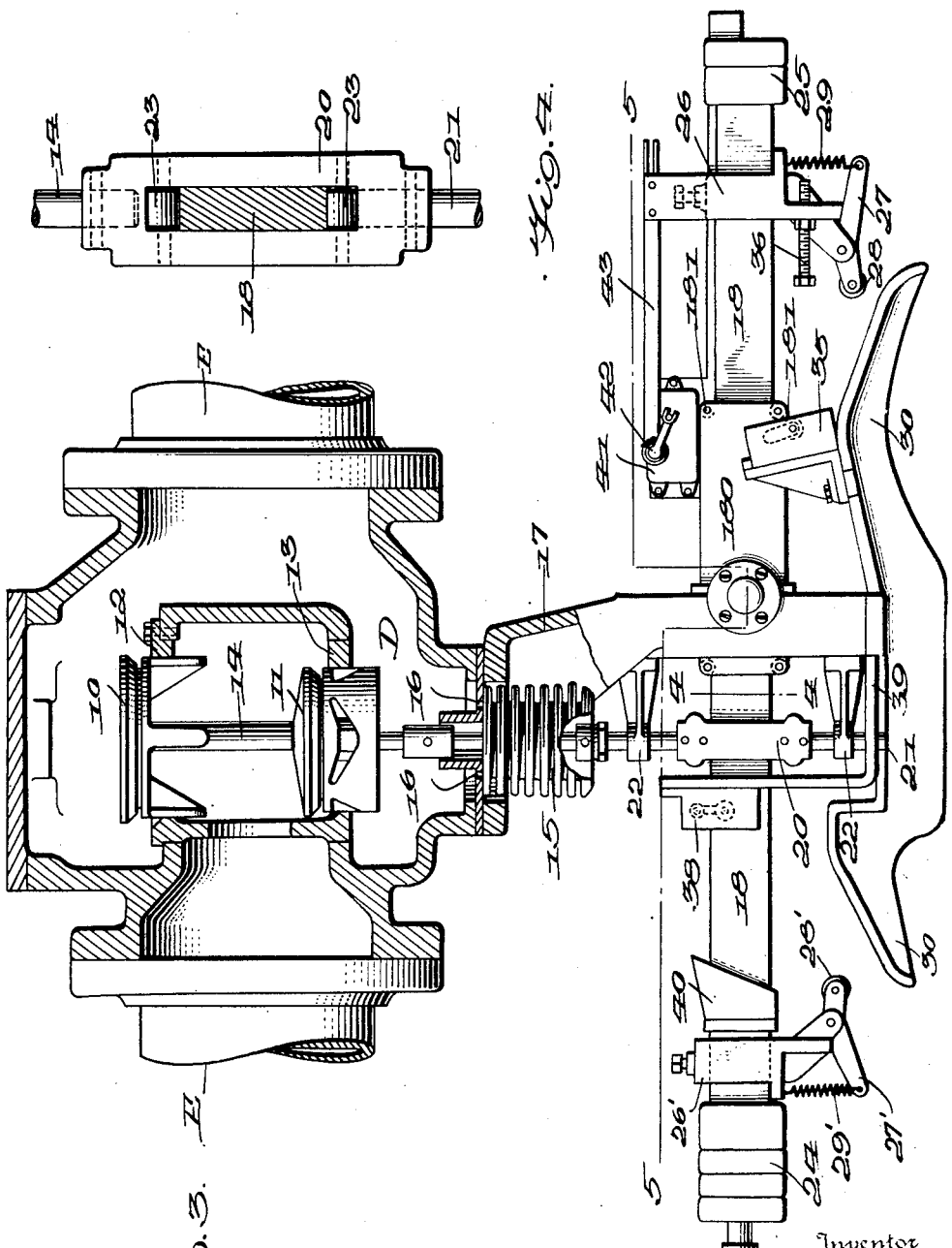

Dec. 13, 1938.                I. C. JENNINGS                 2,140,079
                CONTROL MECHANISM FOR STEAM HEATING SYSTEMS
                    Filed Jan. 17, 1935          7 Sheets-Sheet 4
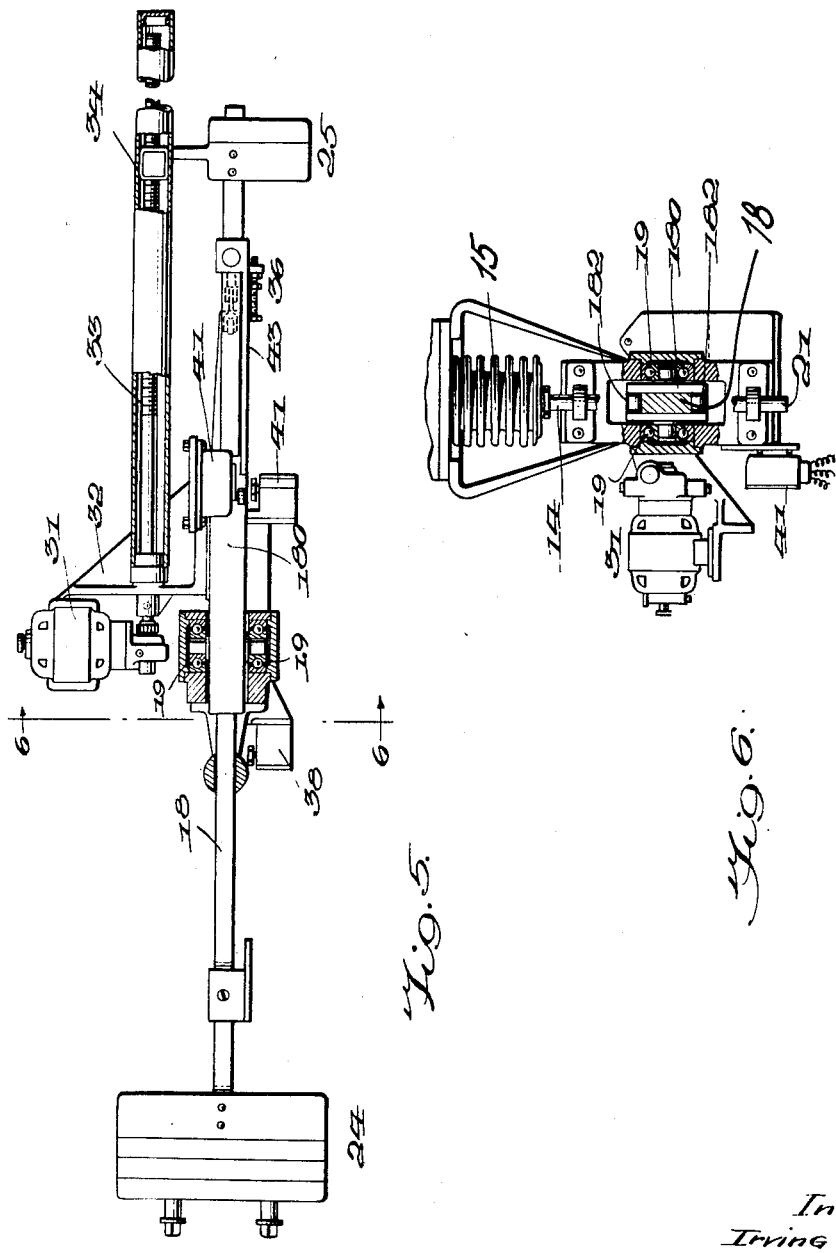
Inventor
Irving C. Jennings
By Smithgate Fay & Hawley
Attorneys Dec. 13, 1938.          I. C. JENNINGS          2,140,079
CONTROL MECHANISM FOR STEAM HEATING SYSTEMS
Filed Jan. 17, 1935          7 Sheets-Sheet 5

Dec. 13, 1938.   I. C. JENNINGS   2,140,079
CONTROL MECHANISM FOR STEAM HEATING SYSTEMS
Filed Jan. 17, 1935   7 Sheets-Sheet 6
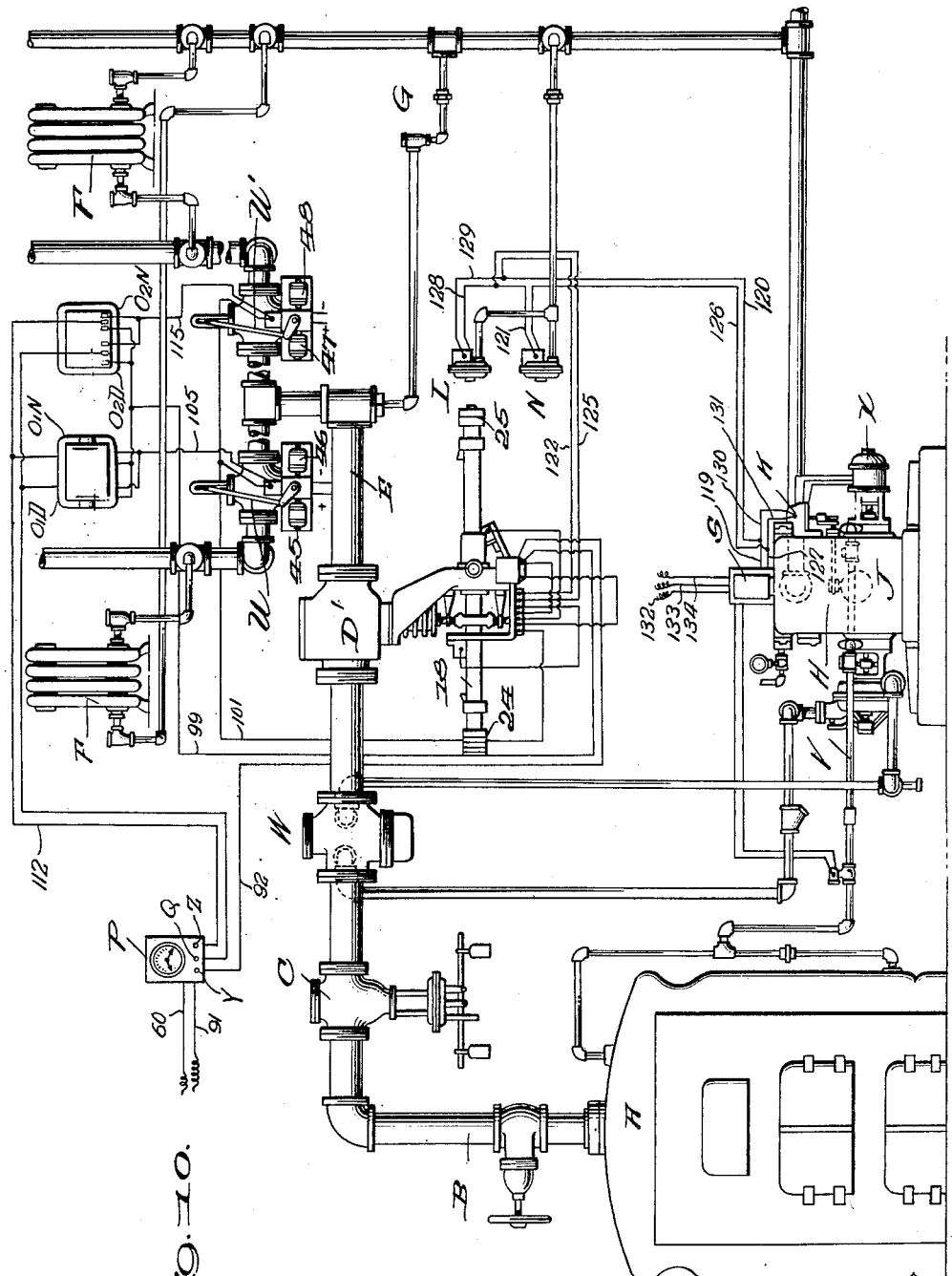
Inventor
Irving C. Jennings,
By Southgate Fay & Hurley
Attorneys

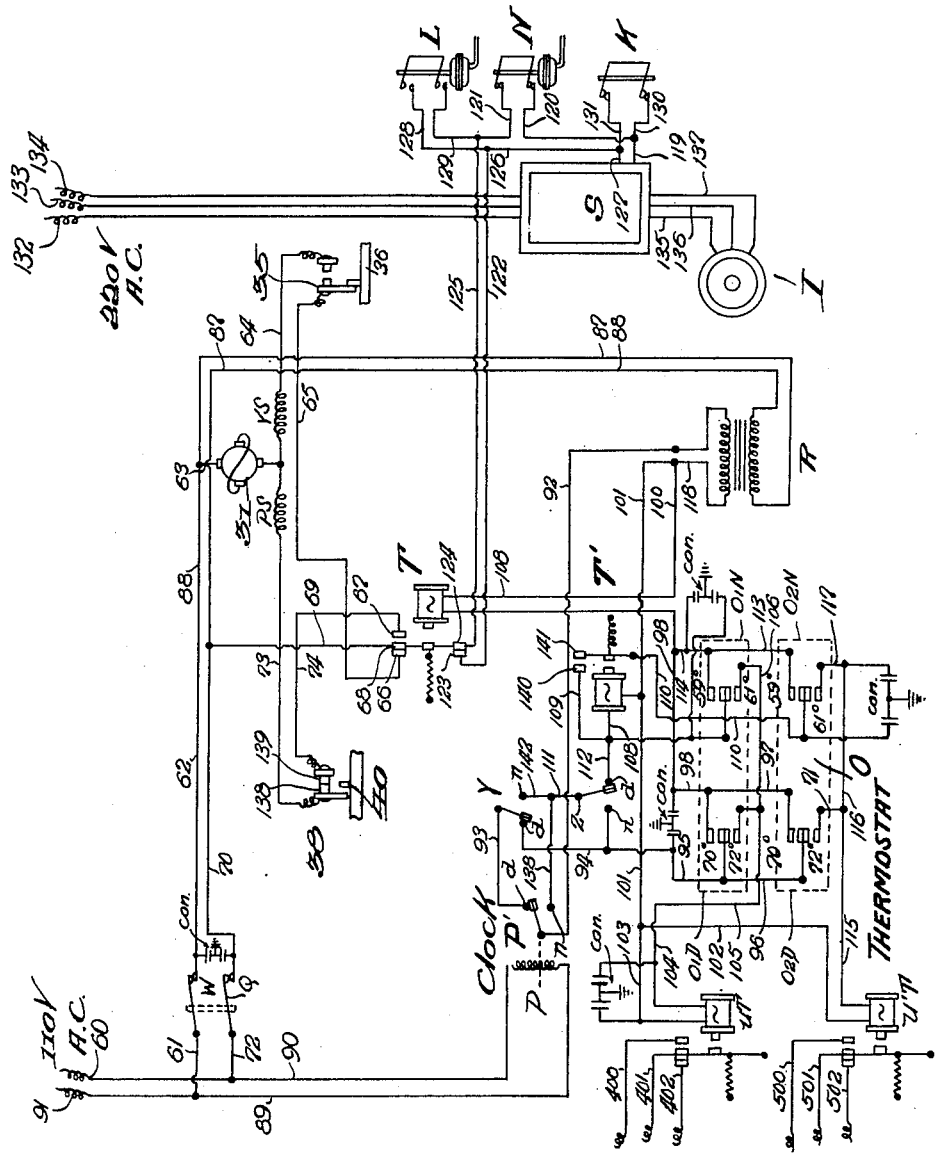

Patented Dec. 13, 1938

2,140,079

UNITED STATES PATENT OFFICE 2,140,079

CONTROL MECHANISM FOR STEAM HEATING SYSTEMS

Irving C. Jennings, South Norwalk, Conn.

Application January 17, 1935, Serial No. 2,279

24 Claims. (Cl. 237—9)

This invention relates to a control mechanism for a steam heating system and particularly but not necessarily for a vacuum steam heating system.

A vacuum steam heating system consists of a source of steam supply connected to the radiators and a pumping mechanism connected to the returns from the radiators. This pumping mechanism consists of a tank connected so that the air and gas in the returns will be separated and pumped out of the system so as to create a vacuum, that is a pressure below atmospheric pressure, in the returns. A water pump is also usually employed to remove the water of condensation from the system and generally to return the same to the boiler.

The improved control mechanism consists of an automatically operating steam pressure controlling valve, or pressure regulator, which keeps the steam supply at a determined pressure to maintain the normal temperature in the area to be heated, and additional mechanism or mechanisms arranged so that said valve will be opened wider to maintain a higher steam pressure, when the area to be heated becomes too cool; and so that said valve will be closed and preferably positively held in closed position, independently of its automatic adjustments, when the area to be heated becomes too hot and no more steam is required.

Thermostatically operated control is provided, so that the valve will be set to operate in any one of these three manners, whereby the temperature of the area to be heated will be maintained within desired limits.

Two vacuum controllers are provided to throw the vacuum pump into and out of operation to produce either one of a plurality of vacuums in the returns of the system or sometimes to cut the vacuum pump entirely out of operation.

The parts are so arranged and combined, that, first, normally the steam valve will be opened and automatically adjusted to allow a throttled supply of steam under a fixed pressure to pass to the radiators and so that the vacuum pump is operated and controlled to produce a high vacuum; second, so that if the area to be heated becomes too cool, the steam valve will be set to give a higher pressure of steam and the vacuum pump will be controlled and operated to produce a low vacuum in the returns; and, third, so that if the area to be heated becomes too hot, the steam valve will be closed, but the vacuum pump will continue to operate so that there will be full vacuum available for circulation as soon as the area to be heated returns to normal temperature.

In some instances when the steam valve is closed, the vacuum controllers may be set so that the vacuum pump will be cut entirely out of operation.

In many installations, the building to be heated, may be zoned and thermostatically controlled shut off valves may be employed so that steam can be cut off from any particular zone, when it gets too hot.

In some installations with properly sized and graded piping or by the use of restricted orifices on the radiators, the vacuum pump may be dispensed with and the control mechanism may operate the system satisfactorily with steam pressures above atmosphere.

By these arrangements, steam can be very economically used, and the building or area to be heated can be kept accurately at a uniform temperature.

The invention is illustrated in the accompanying seven sheets of drawings, referring to which:—

Fig. 2 is a diagram illustrating the electrical connections used in the apparatus shown in Fig. 1.

Fig. 3 is a front elevation, partly in section, of the pressure controlling valve.

Fig. 4 is a cross sectional elevation on the line 4—4 of Fig. 3.

Fig. 5 is a sectional plan view on the line 5—5 of Fig. 3.

Fig. 6 is a cross sectional elevation on the line 6—6 of Fig. 5.

Figure 1:
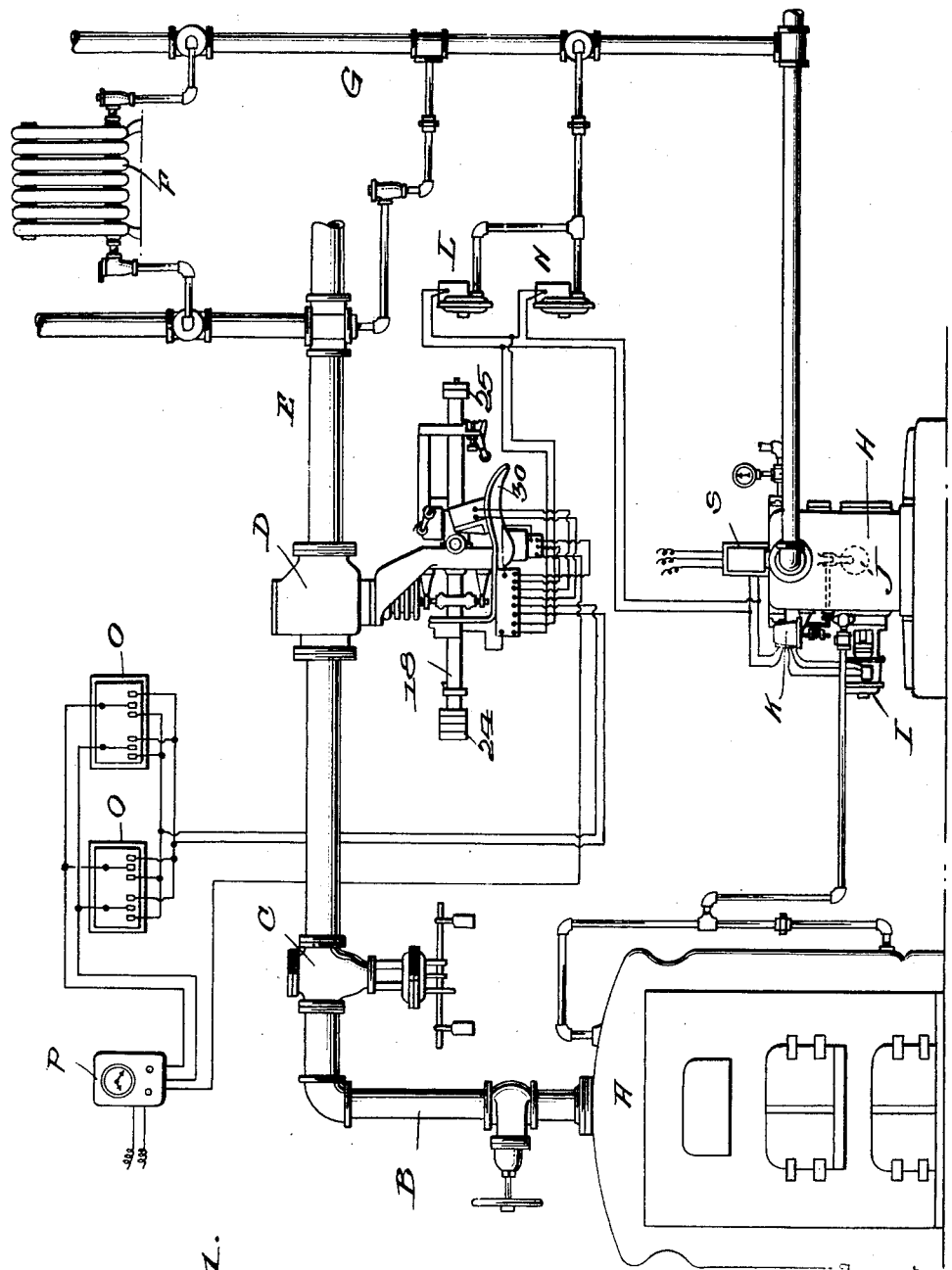
Fig. 1 is a diagrammatic elevation illustrating the application of my invention to an improved steam heating system.

Figs. 7, 8 and 9 are serial diagrammatic views illustrating the positions certain elements of the apparatus assume in the three working positions of the steam valve, the casing of valve D being turned 90 degrees to show the various positions of valves 10 and 11.

Fig. 10 is a view similar to Fig. 1 illustrating a further carrying out of my invention, showing how the same can be connected to control temperatures in a plurality of zones, and Fig. 11 is a wiring diagram showing the electrical connections used in the apparatus shown in Fig. 10.

Referring to the drawings and in detail, A designates a steam boiler, extending from which is a steam pipe B, in which is arranged an automatically operating steam pressure regulator C.

This regulator may be adjusted so that the pressure in the steam pipe beyond the regulator C will be kept constant, say at five pounds.

An automatically operated steam pressure control valve D is arranged in the steam pipe beyond the pressure regulator C, and the pipe E beyond the valve D constitutes the supply pipe for the heating system or radiators F.

The radiators are supplied with the usual valves and traps and are connected by pipes to a return G, which is connected to the receiving tank H of the pumping mechanism.

This pumping mechanism, as shown, consists of a well known unit comprising a Nash vacuum pump for creating and maintaining the vacuum in the returns and pipe G, and a centrifugal impeller for removing the water of condensation and preferably returning the same to the boiler A.

The rotor of the vacuum pump and the impeller of the water pump are usually arranged on a common shaft, which is driven by an electric motor I, which is thrown into and out of operation by a float J in the tank H operating a switch K, and also by one or the other of a plurality of vacuum pump controllers L and N.

The details of this vacuum pumping mechanism are well known and are shown and described, for instance, in Letters Patent of the United States, No. 1,592,024, granted to me July 13, 1926.

The foregoing, with the exception of the employment of the peculiar control valve D and the use of a plurality of vacuum pump controllers, comprises the main or principal elements of a well known vacuum steam heating system, by which steam preferably under a vacuum, that is pressure below that of the atmosphere, can be circulated and employed to heat an area or building.

The details of the control valve D, shown in the third and fourth sheets of the drawings, will now be described.

The same consists of double or balanced valves 10 and 11 cooperating with two valve seats 12 and 13. The valves 10 and 11 are arranged on a stem 14, which stem extends down below the valve casing and is attached to a bellows or pouch diaphragm 15 secured to the bottom of the valve D. The pressure in the exit side of valve D and, therefore, the pressure in pipe E is communicated to the bellows diaphragm through holes 16—16.

An arm or bracket 17 is connected to the bottom of the casing or valve D. A sliding weight bar 18 is fitted to slide in a frame 180 pivoted by ball bearings 19 in said arm 17. The frame 180 contains pins or studs 181 having rollers 182 on which the bar 18 slides.

The lower end of the stem 14 is secured to a yoke 20, and an additional stem 21 is connected to extend downwardly from the yoke. The stems 14 and 21 are fitted in brackets 22—22 secured to the bracket 17. The sliding weight bar 18 passes through the yoke 20 and engages rollers 23—23 carried by the yoke 20. Weights 24 are adjustably fitted on the sliding weight bar 18, and preferably smaller weights 25 are adjustably secured on the other end of the bar 18. By this construction an automatically operating steam pressure control valve is provided, the pressure in the exit end of which is automatically determined by the setting of the weights 24 and 25. It will be seen that the weight bar 18 can slide through the yoke 20, and that when the weight bar is at its left hand extreme—Fig. 3—the weights 24 will pull the valves 10 and 11 down to their seats and close the valve D, shutting off the supply of steam.

To insure this closing action, a bracket 26 is adjustably secured on the bar 18 and the same carries a lever 27 pivoted thereto, which has a roller 28 at its end which normally is held in its lowest position by a spring 29.

A cam plate 30 is secured to the bracket 17 in position so that the roller 28 will slide up on the same as the weight bar moves to the left. This mechanism is provided additionally to cause the valves 10 and 11 to come tightly to their seats, the spring 29 affording a yielding member so that there will be no breakage as the sliding bar 18 is moved to its extreme left hand position.

In Fig. 3 the cam 30 is shown extending on both sides of the bracket 17 and a roller 28' with yielding mechanism is adjustably positioned on the weight bar 18 so that it will slide up on the left extension of cam 30 and positively open the valves 10 and 11 when the weight bar 18 moves to the extreme right. This arrangement may be used when it is desired to do away with the automatic operation and open the valve.

The sliding weight bar 18 is moved back and forth in the yoke 20 by means of a reversible electric motor 31 secured on a bracket 32, connected to frame 180. The electric motor 31 is connected by a reducing gearing to rotate a screw 33 which is threaded into a nut 34 connected to the sliding weight bar 18, as by attachment to the smaller weights 25. By this arrangement the electric motor 31 can move the sliding weight bar back and forth through the yoke 20.

Suitable thermostats O are placed at key positions in the building to be heated so that the temperature can be controlled from a plurality of points. These thermostats are preferably connected electrically in multiple for joint action under normal and too cold conditions, and in series for a too hot condition. The thermostats also are made double poled, so as to control two different circuits, which are selected by an electric time clock P, this arrangement being used so that the control mechanism will be adjusted to give a lower temperature at night, holidays or Sundays, than when the building is occupied.

An electric cut out switch 35 is secured on the cam plate 30 and can be engaged by a screw 36 adjustably threaded into the bracket 26 so that the electric motor 31 will be cut out of operation when the weight bar is moved to its extreme left hand position—Fig. 3—, and a cut-out switch 38 is secured to a bracket 39 extending from the bracket 17, and can be engaged by a cam or block 40 adjustably secured on the weight bar 18 so that the electric motor 31 will be cut out of operation, when the weight bar is moved to its extreme right hand position.

A double pole switch 41 is secured to the bracket 32, the operating arm of which can be engaged by the cam or inclined end 42 of a bar 43 adjustably secured to the bracket 26. The bar 43 is proportioned to engage the switch 41, when the sliding weight bar is in central or position for normal operation of the valve D. The double switch 41 is normally held in cut-out position by a spring 44, shown in Fig. 2.

The electric motor I, which drives the vacuum pump may be operated from a three phase 220 volt alternating current through a starter S.

Low voltage current, stepped down by a transformer R, may be employed in the circuits extending from the thermostats O to relays T and T', and a 110 volt alternating current may be used to operate the weight bar adjusting motor 31. Condensers Con are included in the circuits to prevent sparking.

The operation of the apparatus described is as follows, reference being had to the fifth sheet of the drawings.

In these serial diagrammatic views, Fig. 7 indicates the position of the parts when normal temperature is maintained throughout the building, and all of the thermostats are in open or in inoperative position.

In this position the relays T and T' are inoperative; the limit switches for the weight bar are closed; the motor 31 is inoperative; the automatic steam pressure controlling valve D is in the intermediate or normal position, and the high vacuum controller N is in operation.

In this position of the parts, the valve D will operate to maintain a low normal steam pressure in pipe E, the weight bar rocking on its pivots under the influence of the pressure in the pipe E and under the influence of the adjusted setting of the weights.

Thus, the valve D will work under these conditions as an ordinary automatic pressure regulator, and the vacuum pump will maintain a high vacuum.

For illustration the pressure regulator D may be adjusted to allow steam under twenty inches of vacuum to pass to the system, and the vacuum pump may act to maintain a vacuum of twenty three inches in the returns, thus giving a working steam differential of three inches.

During this operation, the cam end 42 of the bar 43 will maintain the double switch 41 in central or cut-out position.

Assuming that the normal temperature desired in the building is 71 degrees, suppose that the temperature becomes too cool with the valve D in normal operation. Now when the temperature drops to 70 degrees, a thermostat will close, the relay T will operate, and the electric motor 31 will be started in operation to move the sliding weight bar to the extreme right, as shown in Fig. 8. This movement will be limited by the cut-out switch 38. The double switch 41 will be closed so that the circuit by which the motor 31 which shifts the sliding weight bar to the left hand position will be closed. The right hand movement of the sliding weight bar continues until the switch 38 is cut out and the parts of the valve D assume the position shown in the series of diagrams, Fig. 8. When in this position, the valve D will maintain a relatively higher pressure, such as one pound, in the system, and the high vacuum regulator N will be cut out.

In some cases the weights 25 may be increased so that the valve D will open wide when in the position shown in Fig. 8.

The pressure on the system will then be regulated by the reducing valve C, or if the valve C be omitted the pressure on the system may be that of the source of steam.

When the parts are in this position shown in Fig. 8 only the low vacuum controller L operates, and the vacuum pump will be connected to produce a vacuum of say five inches, which will give a working steam differential of about seven inches, which will cause steam at a higher temperature to circulate more rapidly to give more heat in the radiators.

Now when the temperature in the area to be heated returns to the assumed normal, that is 71 degrees, the thermostats will open and the parts will return to the positions shown in Fig. 7.

When the area to be heated becomes too hot, a thermostat will move to the position shown in Fig. 9, the other relay T' will operate, and the parts of valve D will assume the position shown in these serial diagrams.

In this position, the valve D will be closed, and steam will be cut off from the area to be heated and the high vacuum may be maintained in the return side of the system, if desired, so that when steam is again admitted to the system, the circulation will quickly take place.

In some instances, the setting of the pump controller N may be such as to cut the vacuum pump out of operation when valve D is closed.

When the area to be heated returns to normal temperature, the thermostats will all open, and the parts will return to the position shown in Fig. 7.

Thus the system will operate to feed a regulated supply of low pressure steam when the normal temperature is obtained, and maintain this normal temperature as long as possible:— will feed steam at relatively higher pressure when the area to be heated becomes too cool:— and will shut off the steam supply when the area to be heated becomes too hot.

The temperatures and pressures above stated are merely used for the purposes of illustration and different adjustments thereof can be made to meet different conditions.

As before stated, by setting the weights on the sliding weight bar, the normal working pressure may be adjusted.

Having now described the general operation and purpose of the invention, its application to various conditions which may occur will be given.

*Condition 1—day level—71° F.*

Assume an inside temperature of say 71° F., with the time switch PP' in day or high level temperature position and all other conditions as shown. The steam pressure controller D of Fig. 1 is adjusted to the normal position for 71° F.; no current flows in any part of the temperature controlled circuits.

To maintain the desired condition, say 20" vacuum steam, a current flows from one line terminal in motor starter S, along lines 119—120 and 121, through the closed contacts of vacuum switch N, along line 122, through contacts 123—124 of relay T, along lines 125—126—127, through magnetic circuit of motor starter S to other side of one phase, thus energizing the magnetic switching mechanism, and through lines 135—136—137, operating motor I driving the air pump, thereby increasing the vacuum to say 23" when vacuum switch N opens, interrupting the magnetic circuit of starter S, thus stopping the motor I and the air pump.

As the vacuum level drops to 20" again, the vacuum switch N closes and the circuit operation just described is repeated.

Due to vacuum being in excess of 8" the switch L is held open and not effective.

Float switch K operates as previously described to maintain the condensate level.

*Condition 2—from normal day to 72° F.*

Assume that the inside temperature rises from 71° F., Condition 1, to say 72° F., with time switch PP' and manual switches Y and Z in normal day level position as in Condition 1. In this condition it is necessary that the 72° contacts of both thermostats $O_{1D}$ and $O_{2D}$ be closed before any operation occurs, as these contacts are wired and connected in series through line 96.

When the temperature at both thermostat stations, $O_{1D}$ and $O_{2D}$, has caused the 72° element to close contact, current flows from transformer secondary along line 92, through $d$ contacts of time switch PP', along line 93, through $d$ contacts of manual switch Y, along lines 94—95 through 72° contacts of thermostat $O_{1D}$, along line 96 through 72° contacts of thermostat $O_{2D}$, along lines 97—98—99 through electro-magnet of relay T', along line 100 to transformer secondary, completing the circuit and energizing relay T', causing the contact carrying armature to move against the magnetized core of electro-magnet, thus breaking contacts 68—78 and 105—106 and closing contacts 67—68. Current now flows from 110 V. supply along lines 60—61 through the line switch W, along lines 62—63, through motor 31 and field CL, along lines 64—65, through contacts 140—141 of limit switch 35, along line 66, through contacts 67—68 of relay T', along lines 69—70—71, through line switch W, along lines 72—91, completing the circuit and energizing the motor 31, causing it to rotate and moving the steam controller D, Fig. 1, toward closed position.

As the controller D, Fig. 1, advances toward closed, the cam bar 43 overrides the operating arm 44 of the limit switch 41, closing contacts 80—81. As the controller D reaches full closed or shut-off position, the adjustable tripping post 36 contacts the operating arm of limit switch 35, breaking contacts 140—141, thus interrupting the circuit to and stopping motor 31 and positioning the steam controller D, Fig. 1, at closed or shut-off position. The high vacuum control circuit through switch N and the condensate level control circuit through switch K operate as previously described.

Condition 3—day 72° F. to normal

Assume a drop in inside temperature from 72° F., Condition 2, to say 71° F., with time switch PP' and manual switches Y and Z in normal day level position as in Condition 1. As the 72° contacts of thermostats $O_{1D}$ and $O_{2D}$ are connected in series through line 96, the opening of 72° contacts in either thermostat resulting from drop in temperature, demagnetizes relay T', thus releasing the contact carrying armature and breaking contacts 67—68 and closing contacts 68—78 and 105—106. Current now flows from 110 V. supply along lines 60—61, through line switch W, along lines 62—63, through motor 31 and field OP, along line 73, through contacts 138—139 of limit switch 38, along lines 74—82, through contacts 80—81 of limit switch 41, along line 79, through contacts 78—68 of relay T', along lines 69—70—71 through line switch W, along lines 72—91, completing the circuit, energizing motor 31 causing it to rotate and moving the steam controller D, Fig. 1, toward open position. As the controller D moves it carries the tripping post 36 away from the operating arm of limit switch 35, thus closing contacts 140—141; also the cam bar 43, which is over-riding the operating arm 44 of limit switch 41, is carried along until the cam 42 permits the operating arm 44 to rise, thus opening contacts 80—81 and interrupting the 110 V. circuit, stopping motor 31 and positioning the steam controller D, Fig. 1, in the 20" vacuum steam position as in Condition 1.

The high vacuum control through switch N and the condensate level control through switch K function as described in detail previously.

Condition 4—from normal to cold day

Assume a drop in inside temperature to say 70° F. Time switch PP' remains in day or high level position, and manual switches W, Y and Z remain unchanged. Either or both 70° contacts in thermostats $O_{1D}$ and $O_{2D}$ close. As these 70° thermostat contacts are connected in parallel by lines 101 and 102, either one or both are equally effective. For simplicity we assume only $O_{2D}$ to have closed as shown. A current now flows from secondary of transformer R, along line 92 to switch P' of PP', through $d$ contacts along line 93, through $d$ contacts of switch Y, along lines 94 and 101, through 70° contacts of thermostat $O_{2D}$, along lines 102, 103 and 104, through contacts 105—106 of relay T', along line 107, through magnet coil of relay T, along lines 108, 109 and 100 to transformer secondary, completing circuit and energizing magnet of relay T, causing the contact carrying armature to move against the magnetized core, closing contacts 75 and 76 and opening contacts 77 and 78, also opening contacts 123 and 124.

A current now flows from 110 V. supply along lines 60 and 61, through one pole of line switch W, along lines 62 and 63, through motor 31 and field OP, along line 73, through closed contacts 138—139 of limit switch 38, along line 74, through contacts 75 and 76 of relay T, along lines 76, 70 and 71, through other side of line switch W, along lines 72 and 91 to other side of 110 V. supply, completing circuit and energizing motor 31. Motor 31 now rotates, causing steam pressure control valve D, Fig. 1, to open. At full open position the tripping plate 40 engages movable arm of limit switch 38, thus breaking contacts 138—139, interrupting the 110 V. circuit and stopping motor 31, thus positioning the pressure controller D, Fig. 1, at full open position. As the pressure controller D moves toward open position it carries the cam bar 43 away from the operating arm 44 of the limit switch 41. As the cam 42 recedes from the operating arm 44, contacts 84 and 85 of limit switch 41 are closed.

The breaking of contacts 123—124, relay T, make the high vacuum control circuit through switch N inoperative. Low vacuum switch L now functions to maintain a vacuum in the tank H of Fig. 1 of say 5", and the float switch K functions to maintain the condensate level as previously described.

Condition 5—71° normal day from 70° F.

Assume the inside temperature rises from 70° F. as in Condition 4, to 71° F. Time switch PP' remains in day or high level position and manual switches W, Y and Z remain unchanged. The 70° element in thermostat $O_{2D}$ moves to open position, breaking the 70° contacts in interrupting the magnetizing circuit of relay T, releasing the contact carrying armature, breaking contacts 75—76 and closing contacts 76—77 and 123—124.

Current now flows from 110 V. supply along lines 60—61, through line switch W, along lines 62—63, through motor 31 and field CL, along line 64, through contacts 84—85 of limit switch 41, along line 86, through contacts 76—77 of relay T, along lines 76—70—71, through line switch W, along lines 72—91, completing the circuit and energizing motor 31, moving the pressure controller D, Fig. 1, toward closed position. As the pressure controller D moves, the tripping plate 40 is carried away from the operating arm of limit switch 38 and contacts 138—139 are closed; also the controller D carries the cam bar 43 toward the limit switch 41 until the cam 42 contacts the operating arm 44, thus breaking contacts 84—85 and interrupting the 110 V. circuit, stopping motor 31 and positioning the pressure controller D, Fig. 1, for 20" vacuum steam.

High vacuum is maintained through switch N, and condensate level is maintained through switch K as previously described.

Condition 6—night level from 71° normal day level

Assume conditions as at conclusion of Condition 5, with the time switch PP', changed from d contacts to n contacts or night level temperature, transferring the temperature controlled circuits from thermostats $O_{1D}$ and $O_{2D}$ to $O_{1N}$ and $O_{2N}$.

The operating range for night level is considerably lower than the day range, hence the 61° contacts of $O_{1N}$ and $O_{2N}$ are closed, as may be noted in Conditions 1 to 5 inclusive, resulting in an immediate current flow (when the time switch PP' changes) from transformer secondary along line 92 through n contacts of switch PP', along lines 110—111, through d contacts of switch Z, along lines 112—113, through 61° contacts of $O_{1N}$, along line 114, through 61° contacts of $O_{2N}$, along lines 115—98—99, through electro-magnet of relay T', along line 100 to transformer secondary, energizing the electro-magnet of relay T', causing the contact carrying armature to move against the magnetized core of the electro-magnet, breaking contacts 68—78 and 105—106 and closing contacts 67—68.

Current now flows from the 110 V. supply along lines 60—61, through line switch W, along lines 62—63, through motor 31 and field CL, along lines 64—65, through contacts 67—68 of relay T', along lines 69—70—71, through line switch W, along lines 72—91, completing circuit and rotating motor 31, moving the pressure controller D, Fig. 1, toward closed position. As the controller D moves toward closed position, the cam bar 43 over-rides the operating arm 44 of limit switch 41, closing contacts 80—81. As the controller D reaches full closed or shut-off position, the adjustable tripping post 36 contacts the operating arm of limit switch 35, breaking contacts 140—141, thus interrupting circuit to and stopping motor 31, positioning the steam controller D, Fig. 1, at closed or shut-off position.

The high vacuum control and the condensate level control operate as previously described.

Condition 7—hot night to normal night

With the time switch PP' in the night or low level position, assume that temperature has dropped from 71°, as in Condition 6, to 60°. The 61° contacts of both thermostats $O_{1N}$ and $O_{2N}$ will move to open circuit. As the 61° circuit is series connected through line 114, the first contact to open will interrupt the magnetizing circuit to relay T', releasing the contact carrying armature, opening contacts 67—68, and closing contacts 68—78, also 105—106.

A circuit is now established from 110 V. power supply line 60 through line 61, through line switch W, along line 62 and 63, through motor 31 and field OP, along line 73, through contacts 138—139 of limit switch 38, along lines 74—82, through contacts 80—81 of limit switch 41, along lines 79, through contacts 78—68 of relay T', along lines 69—70—71, through line switch W, along lines 72—91 to other side of 110 V. supply, thus causing motor 31 to rotate, moving the steam controller D, Fig. 1, toward open position. As the controller D moves away from closed position it carries the tripping post 36 away from the operating arm of limit switch 35, thus closing contacts 140—141; also the cam bar 43 is carried along the operating arm 44 of limit switch 41 to the cam 42, where the operating arm operated by a spring mechanism rises following the cam, about midway of the cam face, when contacts 80—81 are opened, interrupting the 110 V. circuit, stopping motor 31 and positioning the steam controller D, Fig. 1, at 20" vacuum steam.

The high vacuum control through N and the condensate control through K function as previously described in detail.

Condition 8—normal night to cold night

With time switch PP' in night or low level position and all manual switches in normal position as shown in Fig. 2, Condition 8, assume temperature to have dropped to 59° F. Inasmuch as the 59° contacts of thermostats $O_{1N}$ and $O_{2N}$ are connected in parallel, either or both contacts closing will be equally effective. For simplicity of this description we will assume $O_{2N}$ to have closed the 59° contact, with the drop of temperature to 59° in the vicinity of this station, thus establishing the following circuit:

Current flows from the secondary of transformer R along line 92, through the n contacts of time switch PP', along lines 110—111, through the d contacts of manual switch Z, along lines 112—116, through the 59° contacts of thermostat $O_{2N}$, along lines 117—104, through contacts 105—106 of relay T', along line 107, through magnet coil of relay T, along lines 108—109—100 to other side of transformer R secondary, thus energizing relay T and moving the contact carrying armature thereof against the magnetized core of the coil, opening contacts 76—77 and 123—124 and closing contacts 76—75.

A circuit is now established from the 110 V. supply along lines 60—61, through line switch W, along lines 62—63, through motor 31, and field OP, along line 73 through contacts 138—139 of limit switch 38, along line 74, through contacts 75—76 of relay T, along lines 70—71, through line switch W, along lines 72—91 to other side of 110 V. supply, thus causing motor 31 to rotate, moving the steam controller D, Fig. 1, toward the open position, carrying the cam bar 43 and cam 42 clear of operating arm 44, thus closing contacts 84—85 of limit switch 41. As the controller approaches full open position the tripping plate 40 engages the movable arm of limit switch 38, thus breaking contacts 138—139, interrupting the circuit and stopping motor 31, positioning the steam controller D at full open position. The open circuiting of relay T contacts 123—124 makes the high vacuum control inoperative through switch N. Low vacuum switch L now functions as previously described to maintain a mean vacuum in the tank N of say 5", and float switch K functions to maintain condensate level. All radiators now carry steam at say 2 lbs. pressure.

Condition 9—cold night to normal night

With time switch PP' in night or low level position and all manual switches normal as shown in Fig. 2, Condition 9, assume a rise in temperature from 59° to 60°. Inasmuch as the 59° contacts of thermostats $O_{1N}$ and $O_{2N}$ are connected in parallel, it will be necessary for the surrounding temperature to have raised to 60° at both thermostat stations before control operates to reduce steam pressure. Assuming both 59° contacts open, the magnetizing circuit, described in condition 8, is interrupted and the contact carrying armature of relay T returns to normal position, thus open circuiting contacts 75—76 and closing contacts 76—77 and 123—124.

A 110 V. circuit is now established along lines 60—61 through line switch W, along lines 62—63, through motor 31 and field CL, along line 64, through contacts 84—85 of limit switch 41, along line 86, through contacts 76—77, along lines 70—71, through line switch W, along lines 72—91, completing 110 V. circuit and causing motor 31 to rotate, moving steam controller D, Fig. 1, toward closed position, carrying the tripping plate 40 away from the movable arm of limit switch 38, thus closing contacts 138—139 and carrying the cam bar 43 toward the limit switch 41 until the cam 42 contacts and depresses the limit switch operating arm 44, thus breaking contacts 84—85, interrupting the circuit and stopping motor 31, positioning the steam controller D, Fig. 1, at the 20" vacuum steam position.

*Condition 10—holiday switch*

Assume the time switch PP' to be in day or high level position and it is desired to operate the heating system for a period, say a week-end of two continuous days and nights, at the low level. Re-position manual switch Y to open contacts $d$ and close contacts $n$. The control circuit now starts from transformer R secondary along line 92, through time switch BB' $d$ contacts, along line 93, through switch Y, $n$ contacts, along lines 142, 111, through $d$ contacts of manual switch Z, along line 112 to night thermostat $O_{1N}$ and line 116 to night thermostat $O_{2N}$, resulting in continuous operation at night or low level irrespective of position of time switch PP'. To restore normal operation it is only necessary to return manual switch Y to original position, opening contacts $n$ and closing contacts $d$. It is not necessary to change the time switch setting.

*Condition 11—emergency switch*

Assume the time switch PP' to be in the night or low level position and it is desired to operate the heating system for any period, at the day or high level. It is not necessary to change the time switch PP' setting. Re-position the manual switch Z, opening $a$ contacts and closing $n$ contacts. The control circuit now, starting from transformer R secondary along line 92, through $n$ contacts of time switch PP', along lines 110—111, through $n$ contacts of switch Z, along line 94 to day level thermostat $O_{1D}$, along line 101 to day level thermostat $O_{2D}$, resulting in continuous day or high level operation, irrespective of position of time switch PP'. To restore normal operation return the manual switch Z to original position, opening contacts $n$ and closing contacts $d$.

In Figs. 10 and 11 a modification is shown illustrating how my invention can be connected to control the temperatures in a plurality of zones. In this modification, the pipe E to the radiators is branched, one branch being controlled by a valve U, and the other branch by a valve U'. The pipe U extending to one zone is opened and closed by electric motors 45—46, and the branch U' is opened and closed by electric motors 47—48. The valve D' used in this modification has no cam shut off, so that the valve varies between twenty inches of vacuum and one pound of steam and when any zone becomes too hot, the thermostat set to control the same shuts off its particular supply pipe U or U'. The vacuum regulators or pump controllers N and L are set for operation at twenty-three inches and five inches of vacuum, as in the first modification.

The vacuum pump shown in this modification is driven by a steam turbine V by the steam which passes to the system through a differential valve W, as shown in the patent granted to me December 8, 1931, Reissue No. 18,275, and the operation of the pump is supplemented through an electric motor X arranged as shown in my pending application, Serial No. 707,966, filed January 23, 1934, the electric connections to this motor being substantially the same as to the electric motor in the previous modification.

The operation of this modification will be understood by the wiring diagram shown in Fig. 11.

The application of this modification to various conditions which may occur is as follows:

*Condition 1—day level—71° F.*

Assume an inside temperature of say 71° F. with time switch PP' in day or high level temperature position and all other conditions as shown. The steam pressure controller D of Fig. 10 is adjusted to the normal for 71° F.; no current flows in any part of the temperature controlled circuits.

To maintain the desired condition, say 20" vacuum steam, a current flows from one line terminal in motor starter S, along lines 119—120—121, through closed contacts of vacuum switch N, along line 125, through contacts 123—124 of relay T, along lines 122—126—127, through magnetic circuit of motor starter S to other side of one phase, thus energizing the magnetic switching mechanism, and through lines 135—136—137, operating motor I driving the air pump, thereby increasing the vacuum to say 23", when vacuum switch N opens, interrupting the magnetic circuit of starter S, thus stopping the motor I and the air pump.

As the vacuum level drops to 20", the vacuum switch N again closes and the circuit operation just described is repeated. Due to vacuum being in excess of 8", the switch L is held open and not effective. Float switch K operates as previously described to maintain the condensate level.

*Condition 2—from normal day to 72° F.*

Assume a rise in temperature from 71° F., Condition 1, to say 72° F., with time switch PP' and manual switches Y and Z in normal day level position as in Condition 1.

When the temperature at thermostat $O_{1D}$ has caused the 72° contact to close, current flows from secondary of transformer R, along line 92, through closed contacts $d$ of time switch PP', along line 93, through closed contacts $d$ of holiday switch Y, along lines 94, 95, through 72° contacts of thermostat $O_{1D}$, along lines 105, 104, through electro-magnet coil of relay UT, along lines 103, 101, 118 to other side of transformer R secondary, completing circuit and energizing relay UT, causing the contact carrying armature to move against the magnetized core, opening contacts 401—402 and closing contacts 400—401, thus causing motorized valve U, Fig. 10, to close. Should 72° contacts of thermostat $O_{2D}$ also close, current flows from 95 along 96 through 72° contacts of thermostat $O_{2D}$, along 71—115, through electro-magnet coil U'T, along lines 102—101—118, completing circuit and energizing electromagnet of relay U'T, causing the contact carrying armature to move against the magnetized core, opening contacts 501—502 and closing contacts 500—501, thus energizing the motorized valve U' to close.

The steam pressure controller D is positioned for 20" vacuum steam, and the high vacuum control circuit through vacuum switch N and the condensate control circuit through float switch K operate as previously described.

*Condition 3—from normal to cold day*

Assume a drop in temperature from 71° F., Condition 1, to 70° F., with time switch PP' in day or high level position and all manual switches as shown.

Consequent of drop in temperature, the 70° contacts of thermostats O1D and O2D will be closed and a current flow will be established from secondary of transformer R along line 92, through d contacts of time switch PP', along 93, through the d contacts of holiday switch Y, along lines 94—95—96, through 70° contacts of O2D to line 97, through 70° contacts of O1D to line 98, along lines 97—98—99, through electro-magnet of relay T, along lines 100—118, completing circuit and energizing relay T, causing the contact carrying armature to move against the magnetized core of electro-magnet, opening contacts 123—124 and contacts 66—68, and closing contacts 67—68. A circuit is then established from 110 V. supply along lines 60—61, through line switch Q, along lines 62—63, through motor 31 and field P. S., through closed contacts of limit switch 38, along line 74, through closed contacts 67—68 of relay T, along lines 69—70, through line switch Q, along lines 72—91, completing circuit and energizing motor 31, causing steam pressure controller D to move toward the open position.

As the controller D approaches 2# pressure position the tripping post 40 interrupts the contacts of limit switch 38, thus de-energizing motor 31 and locating controller D in the position predetermined for 2# pressure steam.

The first movement of travel made by controller D towards pressure steam position carries tripping post 36 away from limit switch 35, thus causing limit switch 35 to close in readiness to return the controller to vacuum position the moment the demand for more heat is satisfied.

Energizing relay T has also opened contacts 123—124, thus interrupting the circuit to the high vacuum controller N and consequently making effective the low vacuum controller L, which now functions to maintain a minimum vacuum of say 8". The float switch K functions to maintain the proper condensate level.

*Condition 4—from 70° F. to normal*

Assume a rise in temperature from 70° F., as in Condition 3, to 71° F. Time switch PP' remains in day or high level position and manual switches YZ remain as shown.

Consequent of change in temperature, the day level elements of thermostats O1D and O2D move to open circuit position, no current flows in thermostat circuit, and relay T being de-energized, the contact carrying armature returns to normal position, open-circuiting contacts 67—58 and closing contacts 66—67 and 123—124.

A circuit is now established from 110 V. supply along lines 60—61, through line switch Q, along lines 62—63, through motor 31 and field V. S., along line 64 through limit switch 35, along line 65 through contacts 66—67 of relay T, along lines 69—70, through line switch Q, along lines 72—91, completing circuit and energizing motor 31, causing steam controller D to move toward closed position until at the predetermined position for 20" vacuum steam, the limit switch 35 contacts are opened by the tripping post 36, and steam controller D is positioned for 20" vacuum steam.

The first movement of travel made by controller D toward vacuum steam position carries the tripping post 40 away from limit switch 38, thus causing limit switch 38 to close in readiness to return the controller to pressure steam position the moment the demand for more heat is made.

The de-energizing of relay T, closing contacts 123—124, re-establishes the high vacuum control circuit through lines 122—125, and vacuum controller N now functions to maintain high vacuum.

*Condition 5—night level from normal day*

Assume conditions as described for Condition 4, with time switch PP' changed from d contacts to n contacts or night level temperature, transferring the temperature-controlled circuits from thermostats O1D—O2D to O1N—O2N.

The operating range for night level is considerably lower than the day range, hence the 61° contacts of O1N and O2N are closed, as may be noted in Conditions 1 to 5 inclusive, resulting in an immediate current flow, when time switch PP' changes, from the transformer secondary along line 92, through the n contacts of time switch PP', along 138—111, through d contacts of emergency switch Z; along 112, 108, through electromagnet coil of relay T', along 101, 118, to transformer secondary, completing circuit and energizing electro-magnet of relay T', causing the contact-carrying armature to move against the magnetized core, thus closing contacts 140—141.

Note here that the purpose of relay T' is to prevent a sneak circuit due to the constantly closed 61° contacts of thermostats O1N and O2N during day level operation.

A second circuit flows through the n contacts of time switch PP' along 138—111, through the d contacts of emergency switch Z, along 112—107, through the 61° contacts of thermostat O1N, along 106, 105, 104, through electro-magnet coil of relay UT, along 103—101—118, completing circuit and energizing electro-magnet of relay UT, causing the contact-carrying armature to move against the magnetized core, thus interrupting contacts 401—402 and closing contacts 400—401, thus causing valve U to close.

A third circuit flows from secondary of transformer along 92, through n contacts of time switch PP', along 138—111, through d contacts of emergency switch Z, along 112—109, through closed contacts 140—141 of relay T', along 110, through the 61° contacts of thermostat O2N, along 117, 116, 115, through electro-magnet coil of relay U'T, along 102—101—118, completing the circuit and energizing electro-magnet of relay U'T, causing the contact-carrying armature to move against the magnetized core, opening contacts 501—502 and closing contacts 500—501, thus causing valve U' to close.

The steam pressure controller D remains in the 20" vacuum steam position and the high vacuum control circuit through vacuum controller N is operative together with float switch K for condensate control. The 20" vacuum steam condition and the 2# pressure steam condition will obtain on change of temperature actuating thermostats O1N and O2N as described under Condition 3 and Condition 4, with current path variations as described above.

*Condition 6—holiday switch*

Assume the time switch PP' to be in day or high level position and it is desired to operate the heating system for a period, say a week-end of two continuous days and nights, at low level. Re-position the manual switch Y to open contacts d and close contacts n. Current now flows from secondary of transformer R along 92, through d contacts of time switch PP', along 93 through the n contacts of holiday switch Y, along 142—111, through the d contacts of emergency switch Z, and thence as described for night or low level operation, and will continue to operate at low level until holiday switch Y is restored to normal or d contact position. It is not necessary to change the setting of time switch PP'.

*Condition 7—emergency switch*

Assume the time switch, PP', to be in the night or low level position and it is desired to operate the heating system for any period at the day or high level. Re-position the manual switch Z, opening d contacts and closing n contacts. Current now flows from the secondary of transformer R along 92, through the n contacts of time switch PP', along 138, 111, through the n contacts of emergency switch Z, along 94 and thence as described for day or high level operation, and will continue to operate at high level until emergency switch Z is restored to normal or d contact position. It is not necessary to change the setting of time switch PP'.

*Zone valves U and U'.*—Any reversing type motorized valve with built-in limit switches for full open and full closed control may be used for zone valves. They may be independently energized from the nearest lighting or power circuit, with consequent wiring economy. If low voltage valves are used the nearest circuits may be used, with individual transformer for each valve, thus eliminating voltage drop incurred by long leads. Relays UT and U'T are automatic controllers for these valve motors, the 'OO–'OI contacts energizing the closing circuit and the 'OI–'O2 contacts energizing the opening circuit. The prefix number as 400 or 500 is usually applied to indicate the zone identification as Zone 4 or Zone 5.

Time switch PP' is purposely located back of the line switch Q to provide against frequent resetting or the possibility of neglecting to reset on resuming operation after shut-down periods. The time switch operates continuously.

The details and arrangement of this invention, and its various ramifications may be greatly varied by a skilled mechanic without departing from the scope of my invention as expressed in the claims.

Having thus fully described my invention, what I claim and desire to secure by Letters Patent is:—

1. A control mechanism for a steam heating system comprising an automatically adjustable steam pressure controlling valve means, means to automatically adjust said valve means whereby to keep the steam supply at a determined pressure sufficient to maintain the normal temperature in the area to be heated under ordinary conditions, and additional means operative to insure the opening of said valve means wider, adjacent to a limiting means of adjustment thereof, to maintain a higher steam pressure when the area to be heated becomes too cool.

2. A control mechanism for a steam heating system comprising an automatically adjustable steam pressure controlling valve means, means to automatically adjust said valve means whereby to keep the steam supply at a determined pressure sufficient to maintain the normal temperature in the area to be heated under ordinary conditions, and additional means operative to insure closing of said valve means, adjacent to a limiting means of adjustment thereof, when the area to be heated becomes too hot and no more steam is required.

3. A control mechanism for a steam heating system comprising an automatically adjustable steam pressure controlling valve means, means to automatically adjust said valve means whereby to keep the steam supply at a determined pressure sufficient to maintain the normal temperature in the area to be heated under ordinary conditions, and additional means operative to insure closing of said valve means, adjacent to a limiting means of adjustment thereof, and positively to hold same in closed position when the area to be heated becomes too hot and no more steam is required.

4. A control mechanism for a steam heating system comprising an automatically adjustable steam pressure controlling valve means, means to automatically adjust said valve means whereby to keep the steam supply at a determined pressure sufficient to maintain the normal temperature in the area to be heated under ordinary conditions, and additional means operative to insure opening of said valve means wider, adjacent to a limiting means of adjustment thereof, to maintain a higher steam pressure when the area to be heated becomes too cool, and means operative to insure closing of said valve means, adjacent another limiting means of adjustment thereof, when the area to be heated becomes too hot and no more steam is required.

5. A control mechanism for a steam heating system comprising an automatically adjustable steam pressure controlling valve means, means to automatically adjust said valve means whereby to keep the steam supply at a determined pressure sufficient to maintain the normal temperature in the area to be heated under ordinary conditions, additional means operative to insure opening of said valve means wider, adjacent to a limiting means of adjustment thereof, to maintain a higher steam pressure when the area to be heated becomes too cool, and means operative to insure closing of said valve means adjacent another limiting means of adjustment thereof, and positively to hold same in closed position when the area to be heated becomes too hot and no more steam is required.

6. A control mechanism for a steam heating system comprising an automatically adjustable steam pressure controlling valve means, thermostatically operating control means responsive to temperature in the area to be heated for automatically adjusting said valve means whereby to keep the steam supply at a determined pressure sufficient to maintain the normal temperature in the area to be heated under ordinary conditions, and additional means operative to insure opening of said valve means wider, adjacent to a limiting means of adjustment thereof, to maintain a higher steam pressure when the area to be heated becomes too cool and more steam is needed than is supplied by the normal open position of said valve means.

7. A control mechanism for a steam heating system comprising an automatically adjustable steam pressure controlling valve means, means to automatically adjust said valve means whereby to keep the steam supply at a determined pressure sufficient to maintain the normal temperature in the area to be heated under ordinary conditions, and additional means operative to insure opening of said valve means wider, adjacent to a limiting means of adjustment thereof, to maintain a higher steam pressure when the area to be heated becomes too cool, and thermostatically operating control means responsive to temperature in the area to be heated for throwing said additional means into and out of operation.

8. A control mechanism for a steam heating system comprising an automatically adjustable steam pressure controlling valve means, thermostatically operating control means responsive to temperature in the area to be heated for automatically adjusting said valve means whereby to keep the steam supply at a determined pressure sufficient to maintain the normal temperature in the area to be heated under ordinary conditions, and additional means operative to insure opening of said valve means wider, adjacent to a limiting means of adjustment thereof, to maintain a higher steam pressure when the area to be heated becomes too cool and more steam is needed than is supplied by the normal open position of said valve means, and thermostatically operating control means responsive to temperature in the area to be heated for throwing said additional means into and out of operation.

9. A control mechanism for a steam heating system comprising an automatically adjustable steam pressure controlling valve means, means to automatically adjust said valve means whereby to keep the steam supply at a determined pressure sufficient to maintain the normal temperature in the area to be heated under ordinary conditions, and additional means operative to insure closing of said valve means, adjacent to a limiting means of adjustment thereof, and positively to hold same in closed position when the area to be heated becomes too hot and no more steam is required, and thermostatically operating control means responsive to temperature in the area to be heated for throwing said additional means into and out of operation.

10. A control mechanism for a steam heating system comprising an automatically adjustable steam pressure controlling valve means, means to automatically adjust said valve means whereby to keep the steam supply at a determined pressure sufficient to maintain the normal temperature in the area to be heated under ordinary conditions, and additional means operative to insure opening of said valve means wider, adjacent to a limiting means of adjustment thereof, to maintain a higher steam pressure when the area to be heated becomes too cool, and means operative to insure closing of said valve means, adjacent another limiting means of adjustment thereof, when the area to be heated becomes too hot and no more steam is required, and thermostatically operating control means responsive to temperature in the area to be heated for throwing said additional means into and out of operation.

11. A control mechanism for a steam heating system comprising an automatically adjustable steam pressure controlling valve means, means to automatically adjust said valve means whereby to keep the steam supply at a determined pressure sufficient to maintain the normal temperature in the area to be heated under ordinary conditions, additional means operative to insure opening of said valve means wider, adjacent to a limiting means of adjustment thereof, to maintain a higher steam pressure when the area to be heated becomes too cool, and means operative to insure closing of said valve means adjacent another limiting means of adjustment thereof, and positively hold same in closed position when the area to be heated becomes too hot and no more steam is required, and thermostatically operating control means responsive to temperature in the area to be heated for throwing said additional means into and out of operation.

12. A control mechanism for a vacuum steam heating system employing a vacuum pump, consisting of an automatically adjustable steam pressure controller valve which keeps the steam supply at a determined pressure sufficient to maintain the normal temperature in the area to be heated, under ordinary conditions, mechanism arranged to move said valve to open position when the area to be heated becomes too cool and more steam is needed than can be supplied by the automatic adjustments, and a plurality of vacuum controllers for the vacuum pump so connected that when the system is working on normal steam pressure one controller will cause the pump to operate to create and maintain a relatively high vacuum, and so that when the system is on high steam pressure the other controller will cause the pump to operate to create and maintain a relatively low vacuum, and means for selecting the appropriate vacuum controller in accordance with temperatures in the area to be heated.

13. An automatically operating steam pressure controller valve comprising a valve, a diaphragm and a slidable weight bar connected to said valve, an electric motor for shifting said bar, and means additional to said motor for holding said bar in position when shifted to close said valve.

14. An automatically operating steam pressure controller valve comprising a valve, a diaphragm and a slidable weight bar connected to said valve, an electric motor for shifting said bar, means for holding said bar in position when shifted to close said valve comprising a stationary cam plate, and a part as a roller carried by said bar and engaging said cam.

15. An automatically operating steam pressure controller valve comprising a valve, a diaphragm and a slidable weight bar connected to said valve, an electric motor for shifting said bar, thermostat controlled means connected to throw said electric motor into and out of operation, and electric switches for determining the normal or intermediate position of the weight bar.

16. An automatically operating steam pressure controller valve comprising a valve, a diaphragm and a slidable weight bar connected to said valve, an electric motor for shifting said bar, thermostat controlled means connected to throw said electric motor into and out of operation, a double throw electric switch for determining the normal or intermediate position of the weight bar, and switches for limiting the shifting movements of said bar.

17. An automatically operating steam pressure controller valve comprising a valve, a diaphragm and a slidable weight bar connected to said valve, an electric motor for shifting said bar, thermostat controlled means connected to throw said electric motor into and out of operation, a double throw electric switch for determining the normal or central position of the weight bar, limit switches for limiting the shifting movements of said bar, and means for shifting the double throw switch to central inoperative position when the bar is in normal position.

18. Control means for a steam heating system employing a vacuum pump, comprising an automatically adjustable steam pressure controlling valve which keeps the steam supply at a determined pressure sufficient to maintain the normal temperature in the area to be heated, under ordinary conditions, additional mechanism arranged to open said valve wider independently of its automatic adjustments to maintain a higher steam pressure when the area to be heated becomes too cool, and vacuum control means effective to vary the degree of vacuum maintained by said pump, in accordance with the movement of the valve under influence of said mechanism, said vacuum control means comprising a plurality of controllers, one of which is operative to create and maintain a relatively high vacuum when the system is working on normal steam pressure, and the other of which is operative to create and maintain a relatively low vacuum when the system is on high steam pressure, and means for selecting the appropriate controller in accordance with temperature in the area to be heated.

19. Control means for a steam heating system employing a vacuum pump, comprising an automatically adjustable steam pressure controlling valve which keeps the steam supply at a determined pressure sufficient to maintain the normal temperature in the area to be heated, under ordinary conditions, additional mechanisms arranged to open said valve wider independently of its automatic adjustments to maintain a higher steam pressure when the area to be heated becomes too cool and to close said valve independently of its automatic adjustments when the area to be heated becomes too hot and no more steam is required, and vacuum control means effective to vary the degree of vacuum maintained by said pump, in accordance with the movement of the valve under influence of said mechanism, said vacuum control means comprising a plurality of controllers, one of which is operative to create and maintain a relatively high vacuum when the system is working on normal steam pressure, and the other of which is operative to create and maintain a relatively low vacuum when the system is on high steam pressure, and means for selecting the appropriate controller in accordance with temperature in the area to be heated.

20. Control means for a steam heating system employing a vacuum pump, comprising an automatically adjustable steam pressure controlling valve which keeps the steam supply at a determined pressure sufficient to maintain the normal temperature in the area to be heated, under ordinary conditions, additional mechanisms arranged to open said valve wider independently of its automatic adjustments to maintain a higher steam pressure when the area to be heated becomes too cool, and to close said valve and positively hold same in closed position independently of its automatic adjustments when the area to be heated becomes too hot and no more steam is required, and vacuum control means effective to vary the degree of vacuum maintained by said pump, in accordance with the movement of the valve under influence of said mechanism, said vacuum control means comprising a plurality of controllers, one of which is operative to create and maintain a relatively high vacuum when the system is working on normal steam pressure, and the other of which is operative to create and maintain a relatively low vacuum when the system is on high steam pressure, and means for selecting the appropriate controller in accordance with temperature in the area to be heated.

21. Control means for a steam heating system employing a vacuum pump, comprising an automatically adjustable steam pressure controlling valve which keeps the steam supply at a determined pressure sufficient to maintain the normal temperature in the area to be heated, under ordinary conditions, additional mechanisms arranged to move said valve to wider open position when the area to be heated becomes too cool and more steam is needed than can be supplied by the automatic adjustments, and vacuum control means effective to vary the degree of vacuum maintained by said pump, in accordance with the movement of the valve under influence of said mechanism, said vacuum control means comprising a plurality of controllers, one of which is operative to create and maintain a relatively high vacuum when the system is working on normal steam pressure, and the other of which is operative to create and maintain a relatively low vacuum when the system is on high steam pressure, and means for selecting the appropriate controller in accordance with temperature in the area to be heated.

22. Control means for a steam heating system employing a vacuum pump, comprising an automatically adjustable steam pressure controlling valve which keeps the steam supply at a determined pressure sufficient to maintain the normal temperature in the area to be heated, under ordinary conditions, additional mechanisms arranged to move said valve to wider open position when the area to be heated becomes too cool and more steam is needed than is supplied by normal position, and to hold said valve positively in closed position when the area to be heated becomes too hot and no more steam is required, and vacuum control means effective to vary the degree of vacuum maintained by said pump, in accordance with the movement of the valve under influence of said mechanism, said vacuum control means comprising a plurality of controllers, one of which is operative to create and maintain a relatively high vacuum when the system is working on normal steam pressure, and the other of which is operative to create and maintain a relatively low vacuum when the system is on high steam pressure, and means for selecting the appropriate controller in accordance with temperature in the area to be heated.

23. Control means for a steam heating system employing a vacuum pump, comprising an automatically adjustable steam pressure controlling valve which keeps the steam supply at a determined pressure sufficient to maintain the normal temperature in the area to be heated, under ordinary conditions, mechanism arranged to move said valve to wider open position when the area to be heated becomes too cool and more steam is needed than is supplied by normal position, thermostatically operating control means responsive to temperature in the area to be heated for throwing said mechanism into and out of operation, and vacuum control means effective to vary the degree of vacuum maintained by said pump, in accordance with the movement of the valve under influence of said mechanism, said vacuum control means comprising a plurality of controllers, one of which is operative to create and maintain a relatively high vacuum when the system is working on normal steam pressure, and the other of which is operative to create and maintain a relatively low vacuum when the system is on high steam pressure, and means for selecting the appropriate controller in accordance with temperature in the area to be heated.

24. Control means for a steam heating system employing a vacuum pump, comprising an automatically adjustable steam pressure controlling valve which keeps the steam supply at a determined pressure sufficient to maintain the normal temperature in the area to be heated, under ordinary conditions, mechanism arranged to move said valve to open position when the area to be heated becomes too cool and more steam is needed than can be supplied by the automatic adjustments, mechanism arranged to hold said valve positively in closed position when the area to be heated becomes too hot and no more steam is required, thermostatically operating control means responsive to temperature in the area to be heated for throwing said mechanisms into and out of operation, and vacuum control means effective to vary the degree of vacuum maintained by said pump, in accordance with the movement of the valve under influence of said mechanism, said vacuum control means comprising a plurality of controllers, one of which is operative to create and maintain a relatively high vacuum when the system is working on normal steam pressure, and the other of which is operative to create and maintain a relatively low vacuum when the system is on high steam pressure, and means for selecting the appropriate controller in accordance with temperature in the area to be heated.

IRVING C. JENNINGS.